(12) United States Patent
Neumann

(10) Patent No.: US 7,552,671 B2
(45) Date of Patent: Jun. 30, 2009

(54) CYLINDER WITH FIBER OPTICAL POSITION SENSING DEVICE AND METHOD

(75) Inventor: Ulrich W. Neumann, Simpsonville, SC (US)

(73) Assignee: Parker-Hannifin Corporation, Cleveland, OH (US)

(*) Notice: Subject to any disclaimer, the term of this patent is extended or adjusted under 35 U.S.C. 154(b) by 280 days.

(21) Appl. No.: 11/367,616

(22) Filed: Mar. 3, 2006

(65) Prior Publication Data

US 2006/0144217 A1 Jul. 6, 2006

Related U.S. Application Data

(63) Continuation-in-part of application No. 11/011,388, filed on Dec. 14, 2004, now Pat. No. 7,047,865, which is a continuation of application No. 10/336,264, filed on Jan. 2, 2003, now Pat. No. 6,834,574.

(60) Provisional application No. 60/725,616, filed on Oct. 11, 2005, provisional application No. 60/346,224, filed on Jan. 4, 2002.

(51) Int. Cl.
*F01B 25/06* (2006.01)
*F01B 31/12* (2006.01)

(52) U.S. Cl. ............................................. 91/1; 92/5 R

(58) Field of Classification Search ................... 91/1; 92/5 R

See application file for complete search history.

(56) References Cited

U.S. PATENT DOCUMENTS

| | | | |
|---|---|---|---|
| 3,013,826 A | 12/1961 | Sharp | |
| 3,284,088 A | 11/1966 | Pippert | |
| 4,055,107 A | 10/1977 | Bartley | |
| 4,170,726 A | 10/1979 | Okuda | |
| 4,335,295 A | 6/1982 | Fowler | |
| 4,347,785 A | 9/1982 | Chase et al. | |
| 4,406,939 A | 9/1983 | Golker | |
| 4,533,815 A | 8/1985 | Ecer | |
| 4,547,649 A | 10/1985 | Butt et al. | |
| 4,701,615 A | 10/1987 | Schmitt | |
| 4,756,229 A * | 7/1988 | Drakeley | ........................ 91/1 |
| 4,758,705 A | 7/1988 | Hertzel et al. | |
| 4,765,063 A | 8/1988 | Sing | |
| 4,839,591 A * | 6/1989 | Nomura et al. | ................ 92/5 R |
| 4,901,073 A | 2/1990 | Kibrick | |
| 5,106,455 A | 4/1992 | Jacobsen et al. | |

(Continued)

OTHER PUBLICATIONS

Focus on Lasers, "Laser Marking For Fabricators", *The Fabricator*, May/Jun. 1990.

(Continued)

*Primary Examiner*—Thomas E Lazo
(74) *Attorney, Agent, or Firm*—Daniel J. Whitman

(57) ABSTRACT

An apparatus for sensing movement of a first object relative to a second object. The apparatus includes indicia markings formed on the first object and a sensor capable of reading the indicia markings. A slipper element is secured relative to the sensor and is biased into engagement with the first object. The slipper element maintains the sensor within a predetermined range of distances from the indicia markings on the first object. In one embodiment, the first object is a piston rod of a piston assembly and the second object is a cylinder in which a piston of the piston assembly is located.

17 Claims, 13 Drawing Sheets

U.S. PATENT DOCUMENTS

| | | | |
|---|---|---|---|
| 5,172,485 A | 12/1992 | Gerhard et al. | |
| 5,287,630 A | 2/1994 | Geisler | |
| 5,298,717 A | 3/1994 | DeRossett, Jr. | |
| 5,301,434 A | 4/1994 | Imaizumi | |
| 5,424,508 A | 6/1995 | Swain et al. | |
| 5,455,509 A * | 10/1995 | Semura et al. | 92/5 R |
| 5,456,020 A | 10/1995 | Kellner | |
| 5,539,993 A | 7/1996 | Kilpinen et al. | |
| 5,568,760 A * | 10/1996 | Volzer | 92/5 R |
| 5,607,165 A | 3/1997 | Bredemeyer | |
| 5,632,916 A | 5/1997 | Lappalainen et al. | |
| 5,642,793 A * | 7/1997 | Ljosne | 92/5 R |
| 5,886,317 A | 3/1999 | Hinrichs et al. | |
| 6,234,061 B1 | 5/2001 | Glasson | |
| 6,327,791 B1 * | 12/2001 | Norcross et al. | 33/706 |
| 6,452,158 B1 * | 9/2002 | Whatley et al. | 250/231.13 |
| 6,533,596 B2 * | 3/2003 | Demuth et al. | 439/320 |
| 6,834,574 B2 * | 12/2004 | Neumann | 92/5 R |
| 7,047,865 B2 * | 5/2006 | Neumann | 91/1 |

OTHER PUBLICATIONS

Technology Review, "Position Transducers Provide System Feedback", *Hydraulics & Pneumatics*, Apr. 2000.

"Tool Maker Turns to Laser-Etching", *Modern Machine Shop*, Apr. 1990.

* cited by examiner

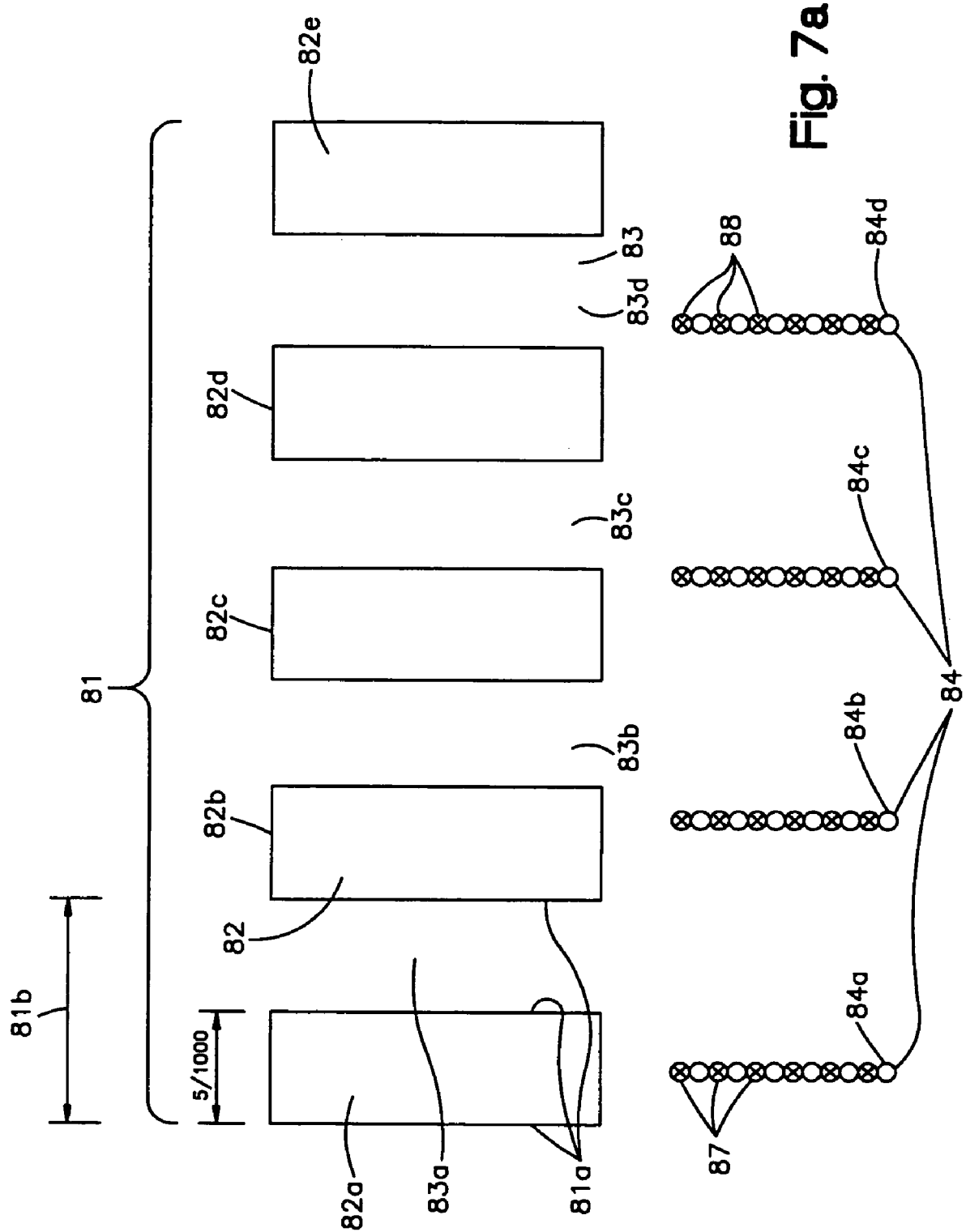

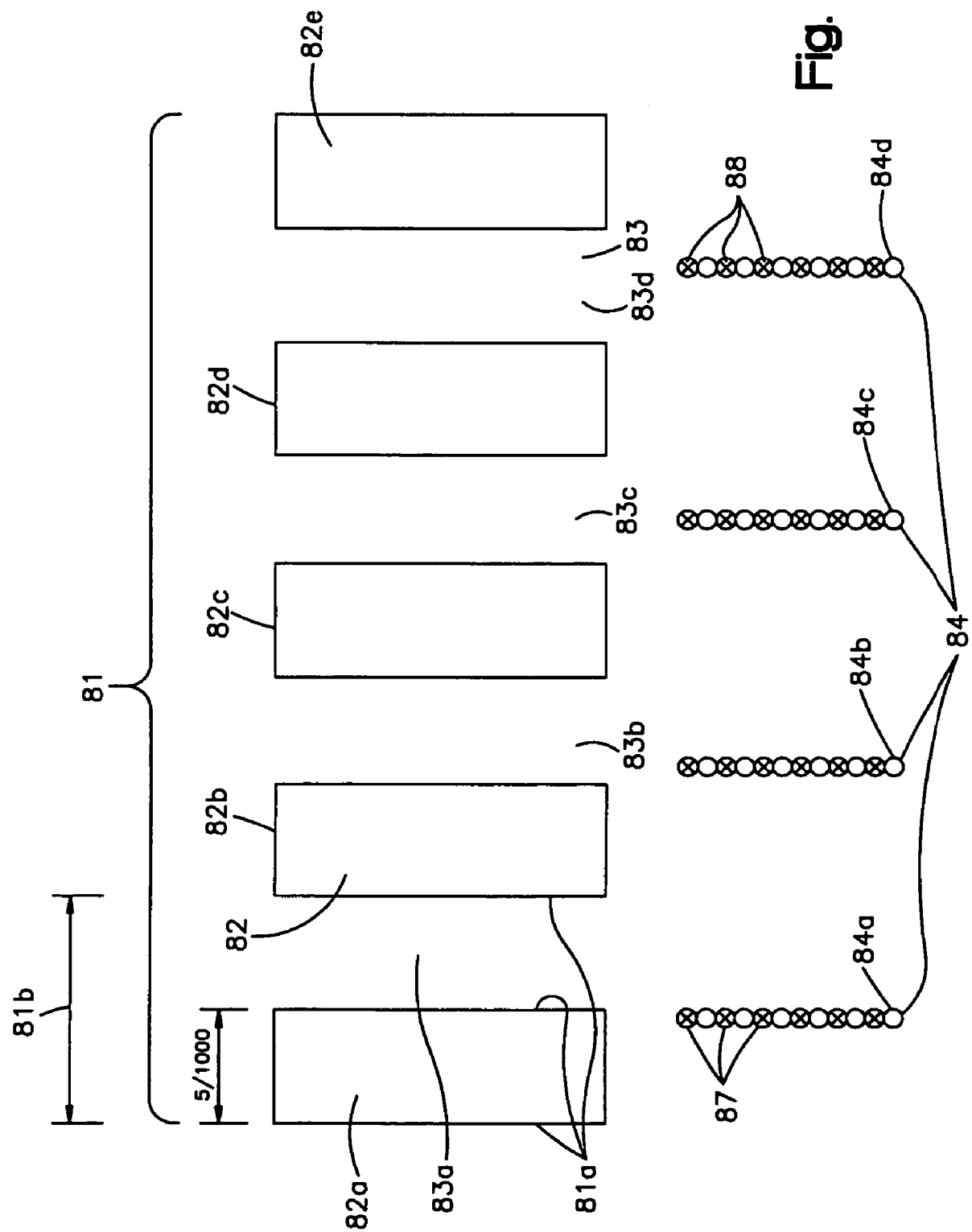

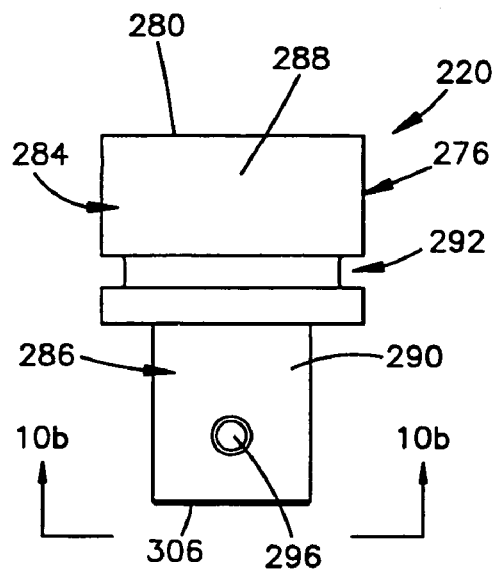
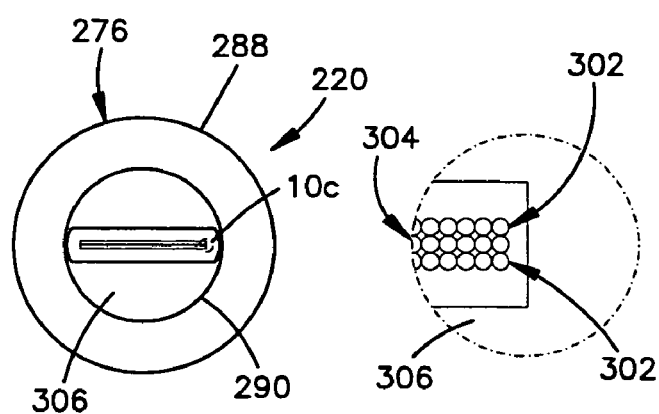
Fig.10a  Fig.10b  Fig.10c
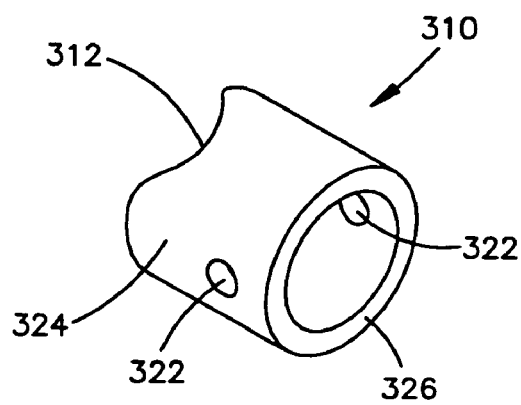
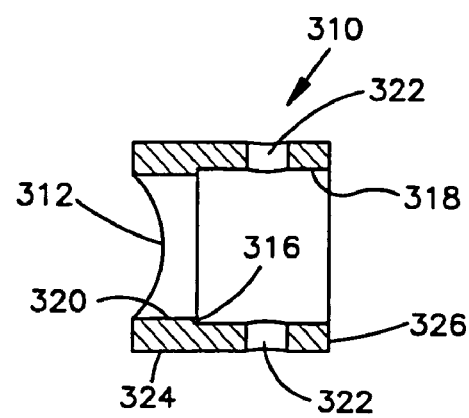
Fig.11a  Fig.11b

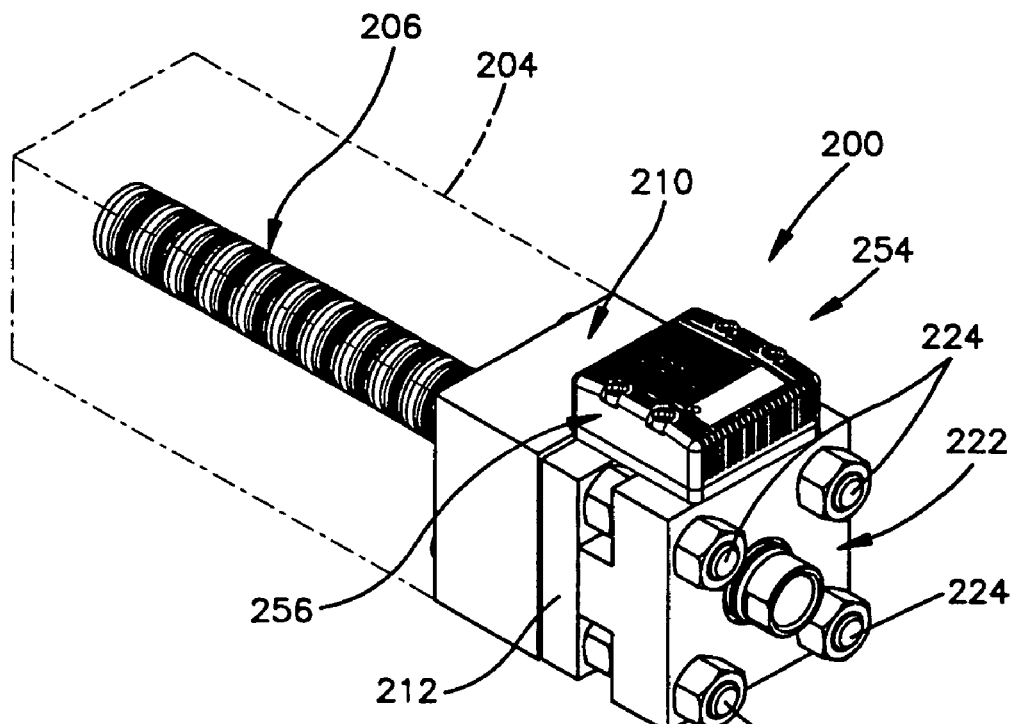
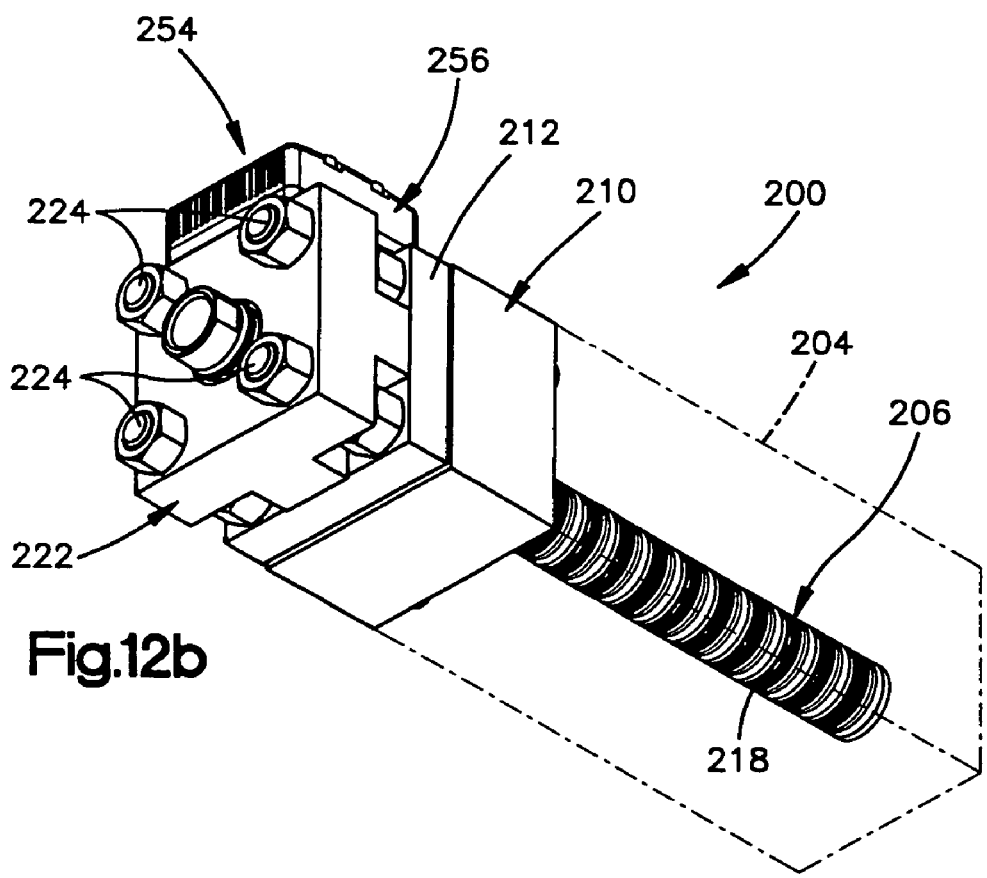

CYLINDER WITH FIBER OPTICAL POSITION SENSING DEVICE AND METHOD

CROSS REFERENCE TO RELATED APPLICATIONS

This application is a continuation-in-part of currently application Ser. No. 11/011,388, filed Dec. 14, 2004 now U.S. Pat. No. 7,047,865, which is a continuation of Ser. No. 10/336,264, filed on Jan. 2, 2003 now U.S. Pat. No. 6,834,574, and which claims priority to provisional patent application Ser. No. 60/346,224 filed Jan. 4, 2002. The disclosures of which are incorporated herein by reference in their entirely. Application Ser. No. 10/336,264 issued on Dec. 28, 2004 as U.S. Pat. No. 6,834,574. This application also claims the benefit of the filing date of U.S. Provisional Patent Application Ser. No. 60/725,616, filed Oct. 11, 2005, the disclosure of which is incorporated herein by reference in its entirety.

BACKGROUND OF THE INVENTION

Piston-cylinder assemblies are used in various actuator applications throughout industry. It is advantageous for an operator to be aware of the specific position of a piston rod in a fluid pressure operated cylinder since the working member being actuated is generally physically connected to the distal end of the piston rod. In order to effectively accomplish this task, several aspects have to be included in the design of such an assembly. Specifically, a readable scale has to be applied to the piston rod, and a sensing device capable of reading the scale has to actually read the scale and communicate this reading, in terms of the specific location of the piston rod, to the operator.

In the past, surfaces have been marked in various ways. Lasers have been used to treat surfaces in order to provide readable scales. An example of a laser marking technique is shown in U.S. Pat. No. 4,547,649 to Butt et al. This patent adds an oxidized layer to a surface and then makes color contrasting marks on this surface that can be detected. Other examples of using lasers to create markings are shown in the following prior art: U.S. Pat. No. 4,533,815 to Ecer; U.S. Pat. No. 4,758,705 to Hertzel et al.; U.S. Pat. No. 4,170,726 to Okuda; U.S. Pat. No. 4,335,295 to Fowler; U.S. Pat. No. 4,347,785 to Chase et al.; U.S. Pat. No. 4,406,939 to Golker; U.S. Pat. No. 5,298,717 to DeRossett, Jr.; U.S. Pat. No. 5,424,508 to Swain et al.; and U.S. Pat. No. 5,886,317 to Hinrichs et al. These prior art patents all use laser technology to remove material from the treated surface. Removal of material from the piston rod surface can create difficulties with providing a complete seal around the piston rod. Without a complete seal, pressure can be lost at these areas and contaminants can infiltrate the system.

In order to ensure that the piston-cylinder assembly is properly sealed, other inventions have treated surfaces without altering the surface geometry of the piston rod. This type of invention is shown in prior art U.S. Pat. No. 5,632,916 to Lappalainen et al. This invention also uses a laser to form a scale without altering the surface geometry that is being marked.

Various other coding scales have been applied to surfaces in the past. For example, U.S. Pat. No. 4,901,073 to Kibrick uses a bar code for determining the position of a movable member relative to a stationary member. U.S. Pat. No. 4,701,615 to Schmitt details the use of a binary code that assists in determining the direction of travel and the position of two objects relative to each other. U.S. Pat. No. 5,632,916 to Lappalainen et al., previously referenced, shows a method of using a laser to create discolorations on a metal surface that can be optically read. In these cases, the treated surfaces are not geometrically altered.

As previously mentioned, a proper seal is required to ensure that the pressure inside the piston-cylinder assembly is not lost. A seal also can provide a way of eliminating any outside contaminants that may possibly enter the enclosed piston-cylinder assembly via reciprocation between the piston rod and the cylinder. The prior art has identified various ways of providing a proper seal. The following prior art sets forth sealing techniques for cylindrical objects: U.S. Pat. No. 3,013,826 to Sharp; U.S. Pat. No. 3,284,088 to Pippert; U.S. Pat. No. 4,055,107 to Bartley; and U.S. Pat. No. 5,607,165 to Bredemeyer.

In order to determine the specific position of the piston rod, a sensor is used to read the coding scales. Different types of sensors have been used in the past. For example, U.S. Pat. No. 5,172,485 to Gerhard et al. uses a position sensor that measures the capacitance between two objects. In U.S. Pat. No. 5,455,509 to Semura et al., a magnetic sensor is used to detect the stroke position of a cylinder. U.S. Pat. No. 6,234,061 B1 to Glasson uses a rotating spool to communicate with a transducer in order to sense the position of a piston rod. U.S. Pat. No. 5,539,993 to Kilpinen sets forth a light emitting and light receiving fiber optic sensor to detect the absolute position of a moving object. Finally, a report in the industry magazine *Hydraulic & Pneumatics*, April 2000 edition, titled "Position transducers provide system feedback", sets forth several devices that provide position information for fluid-power control systems.

SUMMARY OF THE PRESENT INVENTION

The present invention provides an apparatus for sensing movement of a first object relative to a second object. The apparatus comprises indicia markings formed on the first object. The apparatus also comprises a sensor capable of reading the indicia markings. A slipper element is secured relative to the sensor and is biased into engagement with the first object. The slipper element maintains the sensor within a predetermined range of distances from the indicia markings on the first object.

According to another aspect, the present invention provides an apparatus for sensing movement of a first object relative to a second object. The apparatus comprises indicia markings formed on the first object and a sensor capable of reading the indicia markings. A slipper element is secured relative to the sensor and is biased into engagement with the first object. The slipper element includes a stepped internal surface having a first portion with a first diameter, a second portion with a second, smaller diameter, and an internal ridge forming a transition between the first and second portions. An end of the sensor is received in the first portion and abuts against the internal ridge of the slipper element. The sensor and the slipper element further include associated features for enabling the slipper element to be affixed to the sensor for enabling the slipper element to maintain the sensor within a predetermined range of distances from the indicia markings on the first object.

BRIEF DESCRIPTION OF THE DRAWINGS

Further features and advantages of the present invention will become apparent to those skilled in the art upon review of the following specification in connection with the accompanying drawings.

FIG. 7a is a view, similar to that of FIG. 7, but showing the fiber optical sensors displaced an incremental amount to the right;

FIG. 7b is a view similar to that of FIG. 7a, but showing the fiber optical sensors further displaced an incremental amount to the right;

FIGS. 10a and 10b illustrate a probe portion of a sensor of the apparatus of FIG. 9;

FIG. 10c illustrates an enlarged portion of FIG. 10b;

FIGS. 11a and 11b illustrate a slipper element of the apparatus of FIG. 9; and

FIGS. 12a and 12b illustrate perspective assembled views of the portion of the apparatus of FIG. 9.

DETAILED DESCRIPTION OF THE PREFERRED EMBODIMENT

Figure 1:
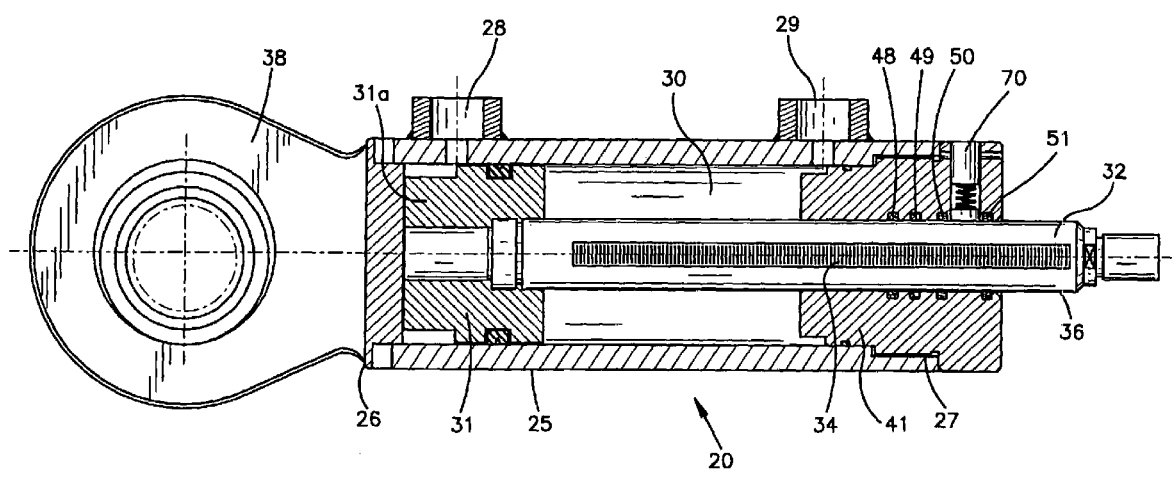
FIG. 1 is an overall longitudinal view, partly in cross-section, of a piston-cylinder assembly encompassing a first preferred embodiment of the present invention.

Referring now to the drawings and particularly to FIG. 1, a first preferred embodiment of this invention is shown generally at 20 in the form of a linear actuator of the piston-cylinder type. The main components include a cylinder 25, a piston assembly 31 comprised of a piston 31a and a piston rod 32, a seal gland 41, seals 48-51, a first cylinder port 28, a second cylinder port 29, and a sensor 70.

Figure 4:
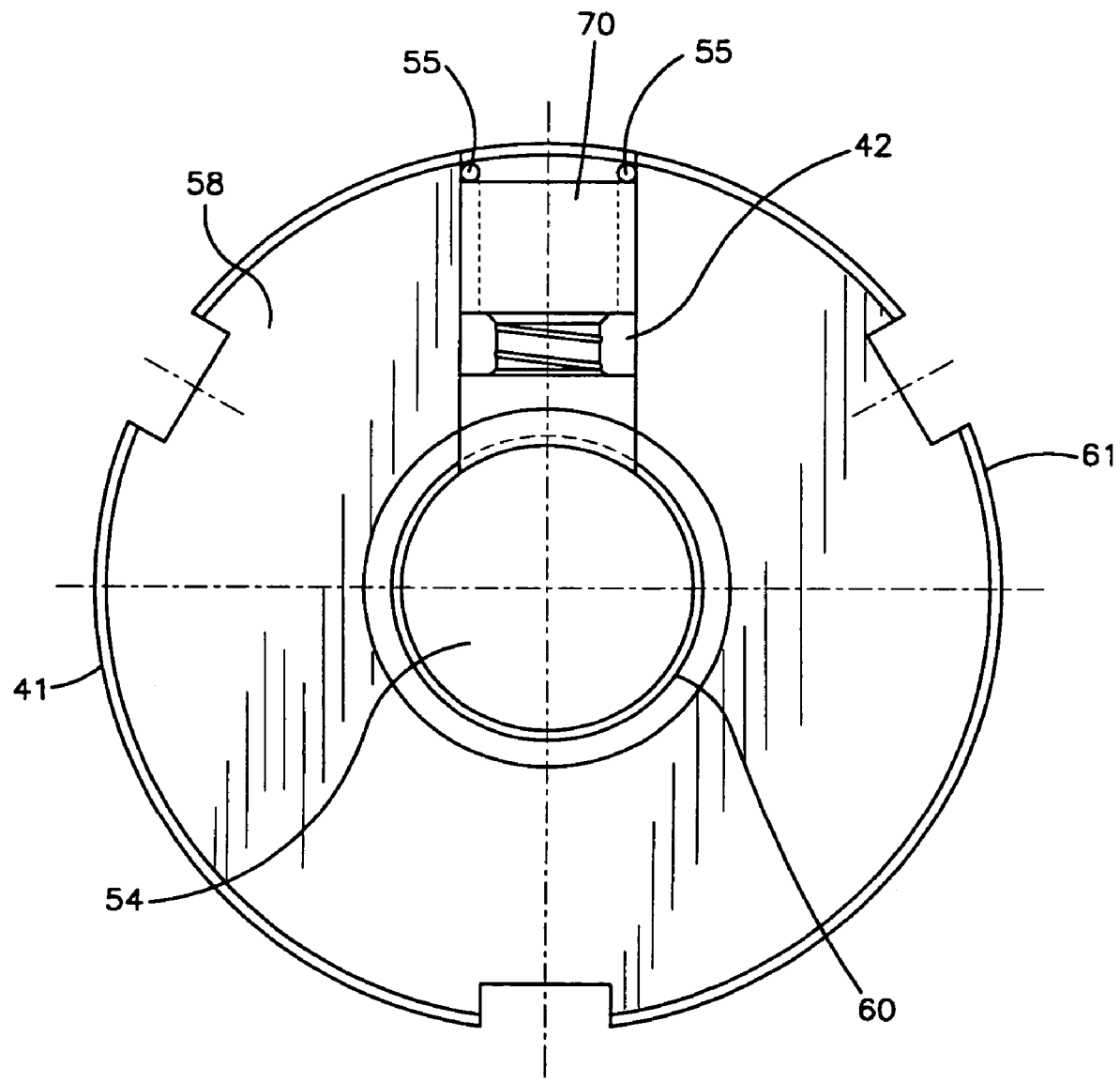
FIG. 4 is a view, partly in cross section view, of the seal gland taken along line 4-4 of FIG. 3 with the addition of a sensor.

Referring to FIGS. 1 and 4, a right circular cylinder 25 houses the piston assembly 31. Cylinder 25 has two opposed ends, one end 26 being closed by a cylinder tube coupling 38, while the other end 27 is adapted to receive apertured seal gland 41. Piston rod 32 has indicia markings 34 provided on at least a longitudinal portion of its peripheral surface 36. Piston rod peripheral surface 36 is preferably provided with a smooth, hard, wear coating, such as for example a hard chrome plated coating that is subsequently ground and/or polished in order to ensure a constant dimension outer diameter at least for its stroke length. As is well known to those skilled in the art, the piston assembly 31 and cylinder 25 can reciprocate relative to each other depending upon which end of the cylinder is pressurized. Pressure is supplied to cylinder 25 by any desired external pressure source (not shown) to first cylinder port 28 and exhausted via second cylinder port 29 and vice versa, depending on the desired direction of movement. Piston rod 32 moves through a central longitudinal aperture 54 in seal gland 41, with seal gland 41 closing the apertured end 27 of cylinder 25. Seal gland 41, in addition to its sealing function, is also adapted to receive an optical positioning sensing device or sensor 70 that is able to detect the precise position of piston assembly 31 and cylinder 25 relative to each other as well as the direction in which the piston assembly 31 is moving relative to the sensor 70.

Figure 3:
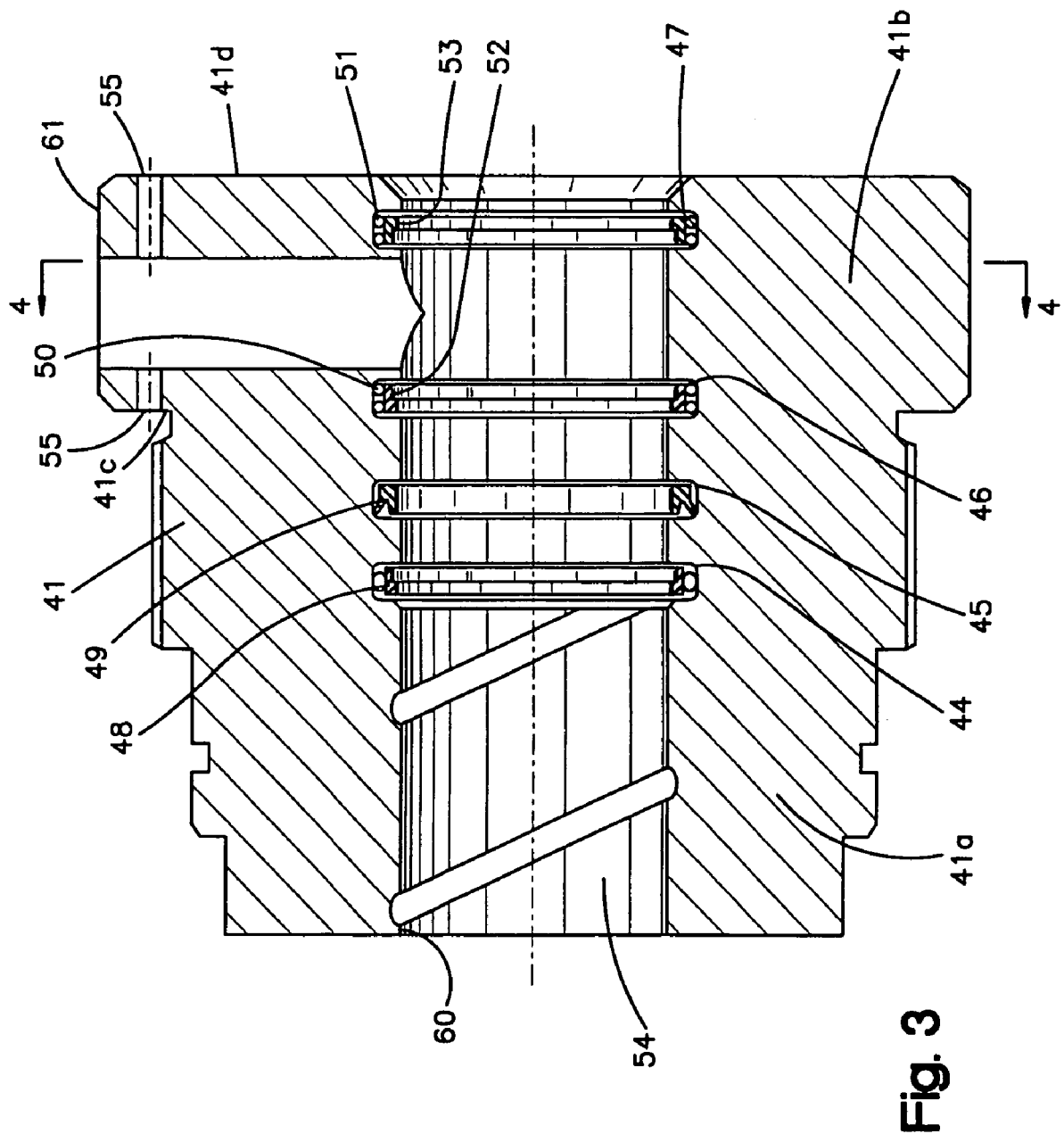
FIG. 3 is a longitudinal, cross-sectional view of a cylinder seal gland having a sensor mounting cavity.

Referring now to FIGS. 1 and 3, seal gland 41 is suitably removably affixed to cylinder 25 at its apertured end 27. Seal gland 41 is comprised of a first body section 41a and a second body section 41b. First body section 41a has an outside surface that mates and sealingly interacts with a corresponding inside surface of cylinder 25. Seal gland second body section 41b has an inner annular surface 41c that abuts the annular end surface of cylinder apertured end 27. The outer peripheral surface of seal gland second body section 41b is preferably flush with the outer peripheral surface of cylinder 25. Seal gland 41 also includes the noted central axial aperture 54 that allows reciprocating passage or movement of piston rod 32. Referring to FIG. 3, an inner peripheral surface 60 of seal gland 41 is provided with a series of spaced circumferential recesses, 44-47, which serve to receive seals 48-51, respectively. Peripheral seals 48-51 function to provide a leak tight seal between piston rod peripheral surface 36 and seal gland inner peripheral surface 60. Referring again to FIGS. 1 and 4, it should be understood that the diameter of seal gland aperture 54 and the diameter of piston rod 32 are dimensioned in order to permit the smooth passage of piston rod 32 while preventing pressurized working fluid from migrating outside the pressurized volume or cavity 30 of cylinder 25. Referring to FIGS. 1 and 3, seals 48 and 49 ensure that a fluid tight pressure seal is provided between piston rod peripheral surface 36 and seal gland inner peripheral surface 60. Seals 50 and 51 are positioned in recesses 46 and 47 respectively, and are located on opposite sides of a sensor cavity 42 (to be described hereinafter) and ensure that oil or any other contaminants do not migrate into sensor cavity 42.

Referring to FIG. 3, a lip portion 52 of seal 50 is angled away from sensor cavity 42 and towards the body of cylinder 25. Lip portion 52 acts as a sealant and a wiper with reference to piston rod 32. This ensures that any fluid that collects on piston rod peripheral surface 36 does not enter sensor cavity 42 but rather remains in pressurized cavity 30. A lip portion 53 of seal 51 is likewise angled away from sensor cavity 42 and away from cylinder 25 and also acts as a sealant and a wiper with respect to piston rod 32. The direction of the action of seal 51 is opposite the direction of action of seal 50 and prevents any outside contaminants from entering seal gland aperture 54, and sensor cavity 42. While any desired seal material can be utilized, seals 50 and 51 are preferably made of a commercially available bronze filled polytetrafluoroethylene compound. Such a compound reduces the friction between seals 50, 51 and piston rod 32, while still providing the required sealing capabilities. Thus, a wet lubricant is not required to ensure the desired low friction. Due to the low friction characteristics of this seal material compound, the shape of seals 50 and 51 does not change appreciably. Seal 51 is positioned inside recess 47 in a compression fit towards piston rod 32 in order to have a constant inward force acting on piston rod 32. This further ensures proper sealing between piston rod 32 and seal gland 41.

Figure 2:
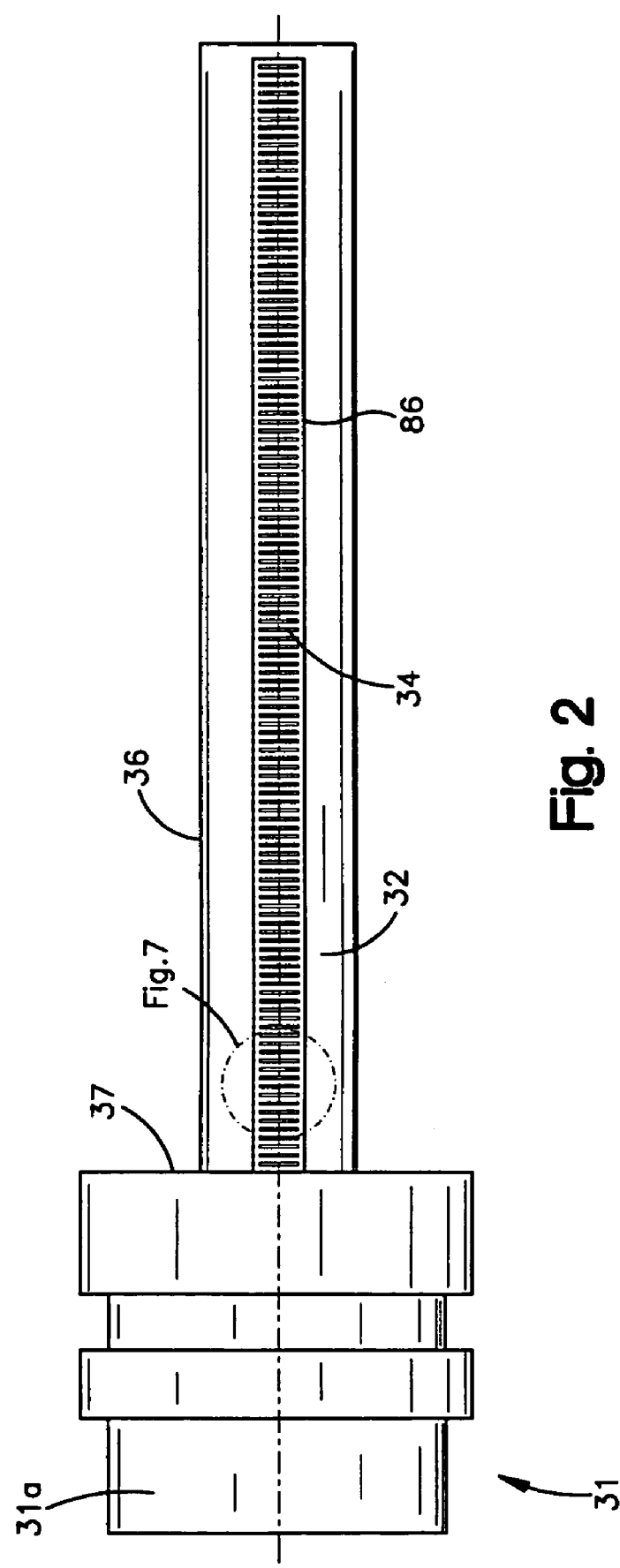
FIG. 2 shows a schematic piston and rod assembly with indicia markings on the rod peripheral surface used in the cylinder of FIG. 1.
Figure 7:
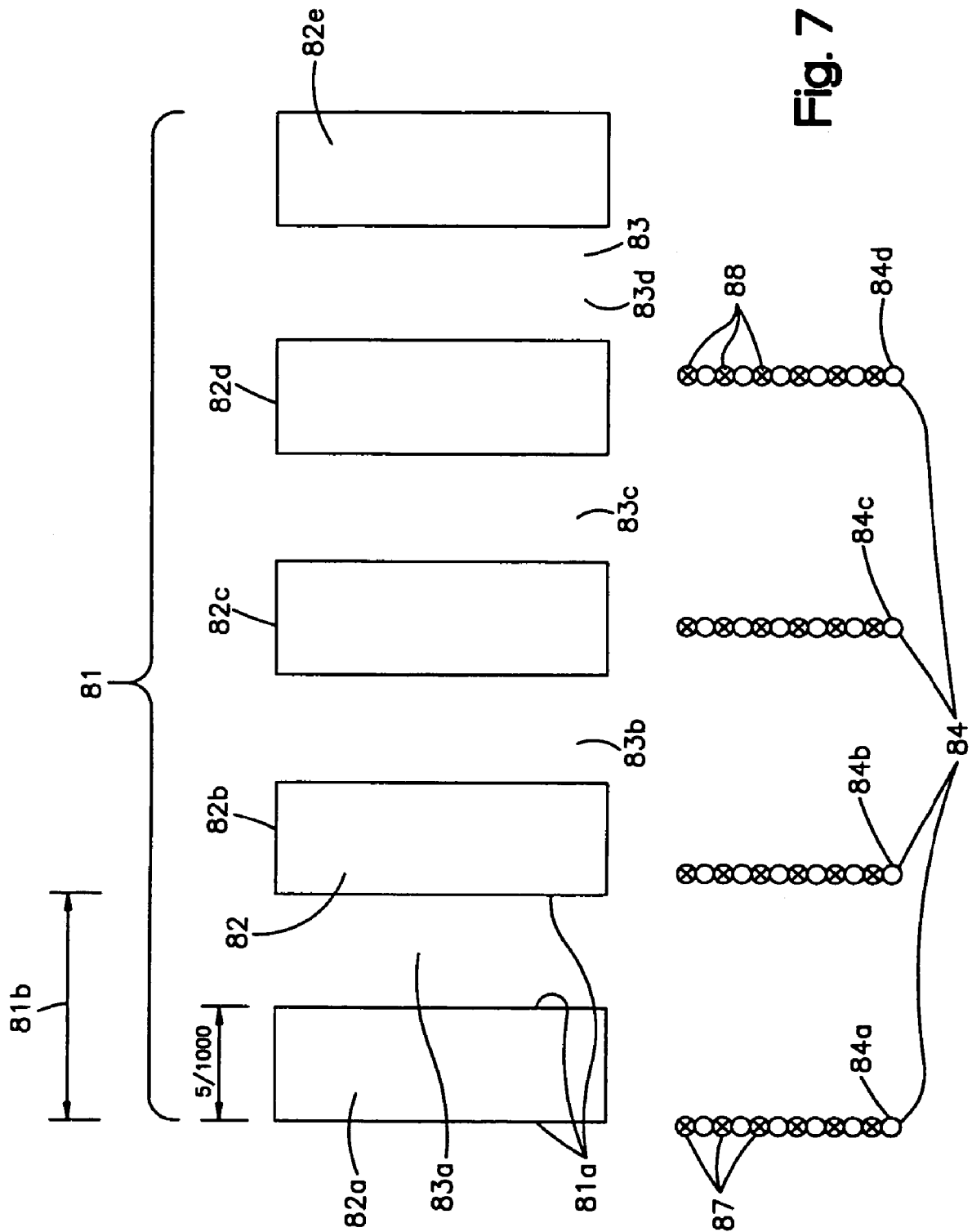
FIG. 7 is an enlarged scale showing of the circled area in FIG. 2 together with fiber optical sensors shown at the bottom.

Referring to FIGS. 1, 2 and 7, piston rod 32 has indicia markings 34 provided on its peripheral surface 36 in the form of optically discernible markings 81, preferably of an incremental scale type. Indicia markings 34 are provided on piston rod peripheral surface 36 by changing the molecular structure of those portions of piston rod surface 36 that correspond to the desired indicia markings, here in the form of a repeating line incremental scale 81 comprised of a plurality of equally spaced lines 81a. For example, lines 81a can be formed via the use of a CNC lathe having a programmed laser such as for example a Nd-YAG Laser, mounted on its tool post wherein the CNC lathe is utilized to both rotate the piston rod for the laser to generate lines 81a and for subsequently indexing the piston rod for successive indicia markings. It is believed that indicia markings 34 that result from the laser treatment change the molecular structure of the wear resistant peripheral surface 36 by annealing the surface material to a predetermined depth. It is theorized that the impingement of the laser beam, in the form of the desired indicia lines 81a, upon piston rod peripheral surface 36, produces a very high localized temperature for a very short duration of time, with the subsequent cooling or quenching thereof resulting in the noted annealed surface in the form of the desired indicia lines 81a. Another but different laser marking process is disclosed in U.S. Pat. No. 5,632,916 to Lappalainen. The noted molecular structural change in piston rod peripheral surface 36 provides detectable surface topography changes. These changes alter the light reflectivity for only the treated indicia markings or portions 34 of piston rod peripheral surface 36 in the noted incremental pattern 81 while not disturbing the surface geometry thereof in terms of surface finish and not altering the reflection angles of light of the non-treated portions of the wear coating of piston rod peripheral surface 36. Pattern 81 forms an incremental scale that can be recognized by sensor 70.

Figure 6:
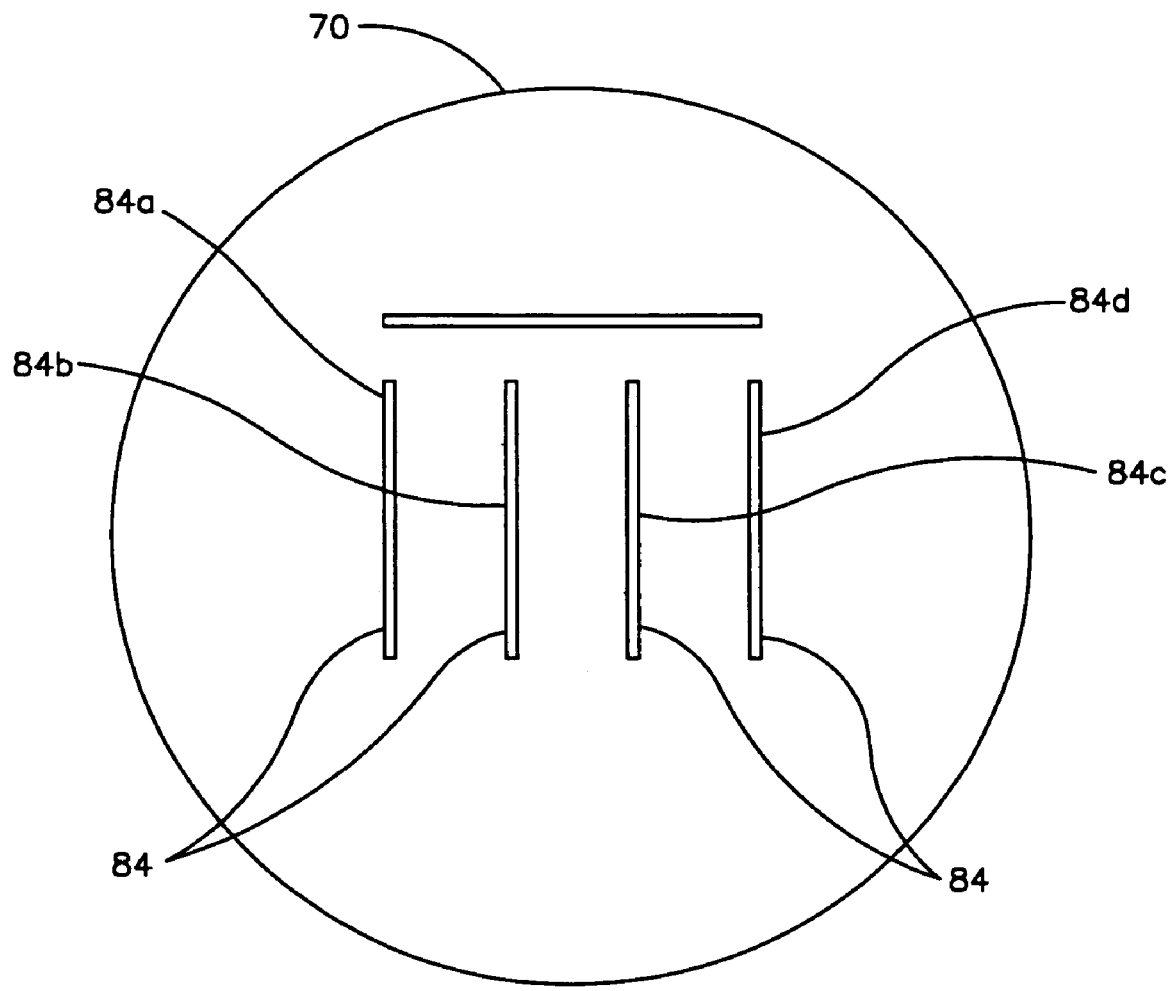
FIG. 6 is a view of the inner end surface of the sensor shown in FIG. 5.

Referring to FIGS. 1, 3, and 4, seal gland 41 is provided with a sensor cavity 42 that extends from seal gland aperture 54 radially outward to outer surface 61 of seal gland second body section 41b. Sensor 70, which is removably positioned within sensor cavity 42, preferably is a fiber optical type sensor that outputs a reading of the positions of piston rod 32 and cylinder 25 relative to each other in a manner to be described hereinafter. Referring again to FIG. 7, scale 81 is arranged so that the absolute position of piston rod 32 can be detected relative to a predetermined starting point. This will occur after piston rod 32 has moved a nominal distance relative to sensor 70. For example, each scale increment 81b is spaced 0.010 of an inch from its axially adjacent increments. Scale increment 81b is comprised of two portions, a marked portion 82 and an unmarked portion 83. Each portion has a width of 0.005 of an inch. Referring to FIGS. 6 and 7, four fiber optic sensor arrays 84 are positioned in sensor 70 in order to read the incremental pattern 81, and specifically to detect the change in reflected light from marked portions 82 to reflected light from unmarked portions 83, and vice versa.

As best seen in FIG. 7, fiber optic sensor arrays 84 on sensor 70 are uniformly spaced at a quarter phase shift interval of the incremental markings 82 and 83 so that changes in fiber optic sensor arrays 84 do not occur simultaneously. The changes will occur in a predictable order so that a specific change pattern occurs which will then detail the direction of movement and the absolute location of piston rod 32 relative to a predetermined starting point in a manner to be described in more detail hereinafter.

For example, referring to FIGS. 1 and 7, as the incremental pattern 81 on piston rod 32 moves relative to fiber optic sensor arrays 84, the fiber optic sensor arrays will detect the changes from marked portions 82 to unmarked portions 83, and vice versa. This will enable fiber optic sensor arrays 84 to determine the precise location of the piston assembly 31 relative to cylinder 25. Assuming a starting position as shown in FIG. 7 and an ending position as shown in FIG. 7a, when piston rod 32 moves to the left at 0.0025 of an inch increments, sensor arrays 84 will detect the following changes. Sensor 84a will not detect any change, since sensor 84a will begin viewing marked portion 82a and end viewing at marked portion 82a. Sensor 84b will detect a change since it began viewing marked portion 82b and ended viewing unmarked portion 83b. Sensor 84c will not detect a change since it begins viewing unmarked portion 83 and ends at viewing unmarked portion 83c. Sensor 84d will also detect a change from unmarked portion 83 to marked portion 82e. Hence, while sensor 84a detects a movement from a marked portion to another marked portion there is no change. Sensor 84b detects a change from a marked portion to an unmarked portion. Sensor 84c also detects a movement from an unmarked portion to another unmarked portion but again there is no change. Finally, sensor 84d detects a change from an unmarked portion to a marked portion.

This sequence of the noted changes and no changes allows the sensor 70 to detect both the direction of movement and the precise position of piston assembly 31 relative to cylinder 25. To further illustrate this sequence, (assuming a starting position as shown in FIG. 7a and an ending position as shown in FIG. 7b) when piston assembly 31 moves to the left again at 0.0025 of an inch with respect to cylinder 25, sensor 70 will detect the following changes: Sensor 84a will detect a change, since it begins viewing at marked portion 82a and ends at unmarked portion 83a. Sensor 84b will not detect a change since it both begins and ends viewing at unmarked portion 83b. Sensor 84c will detect a change since it begins viewing at unmarked portion 83c and ends at marked portion 82d. Sensor 84d will not detect any change since it begins and ends viewing at marked portion 82e. Hence, fiber optic sensor 84a detects a change from marked portion to an unmarked portion. While sensor 84b detects a movement from an unchanged portion to another unchanged portion, there is no change. Sensor 84c detects a change from an unmarked portion to a marked portion while sensor 84d detects a movement from a marked portion to another marked portion there is no change. This sequence of the noted changes and no changes again allows the sensor 70 to detect both the direction of movement and the precise position of piston assembly 31 relative to cylinder 25. As one skilled in this art will understand from this example, the piston assembly has to move only 0.0025 of an inch in order for sensor 70 to both detect the position as well as the direction of movement of piston assembly 31 relative to cylinder 25.

Referring again to FIG. 2, preferably indicia markings 34 on piston rod 32 extend from at least an inner annular surface 37 of piston 31a to the location where sensor 70 initiates its sensing function relative to piston rod 32 when piston rod 32 is fully retracted. This extent of the indicia markings 34 thus coincides with at least the full stroke of the piston assembly 31 within cylinder 25. Indicia markings 34 are preferably formed on piston rod surface 36 in a longitudinal band 86 and the width of the indicia band has to exceed the possible degree of relative rotary movement between the piston and the cylinder. For example, it is known that in such installations, due to the use of self-aligning bearings, piston rod 32 and cylinder 25 can each rotate about +/−7°. Thus, the maximum relative degree of rotation between the piston and the cylinder is about 14°. The width of the indicia band must therefore exceed this maximum degree of rotary movement so that the misalignment tolerance does not cause band 86 to be angularly outside of the field of view of sensor 70.

Referring back to FIG. 1, during the operation of piston-cylinder device 20, sensor 70 is able to detect the incremental scale, piston rod indicia markings 34. When cylinder 25 receives pressure from an external source through its first cylinder port 28, piston assembly 31 will move away from the closed end 26 of the cylinder towards the apertured end 27 of the cylinder. Sensor 70 will be able to detect the displacement of piston assembly 31 by continually ascertaining indicia markings 34. This enables a continuous and precise detection of the positions of piston assembly 31 and cylinder 25 relative to each other and more specifically the precise location of piston rod 32 relative to cylinder 25, within the limits of the stroke of piston rod 32, at all times.

Referring to FIGS. 1-4, during operation, in order to achieve a desired position of the piston rod 32 relative to cylinder 25, pressurized fluid may be supplied to either of cylinder ports 28 or 29. During the extension of piston rod 32 fluid is supplied through inlet port 28. Seals 48-50 prevent any pressurized fluid from leaking past the seal gland 41, into sensor cavity 42 or past the cylinder apertured end 27. Specifically, lip portion 52 of seal 50 will wipe away any fluid that has remained on piston rod peripheral surface 36. Due to the previously noted dimensioning of piston rod 32 and seal gland aperture 54 as well as the utilization of seals 48-50, sensor 70 is not exposed to any pressure or pressurized fluid and thus cannot be adversely affected by it. During the retraction of piston rod 32, fluid is supplied through second cylinder port 29. Seal 51 prevents any outside fluid or contaminants that have collected on piston rod 32 from entering sensor cavity 42. Specifically, lip portion 53 of seal 51 will wipe away any material that has collected on piston rod peripheral surface 36. Thus, sensor 70 will not be adversely affected by any outside contaminants. The unique physical location of sensor 70, inside seal gland 41, ensures that sensor 70 will function in its intended manner. Pressure, pressurized fluid, and outside contaminants can adversely affect the functionality of sensor 70. Protecting sensor 70 from being exposed to fluid pressure and outside contaminants ensures its precision and longevity.

Referring to FIGS. 1, 3 and 4, sensor 70 can be inserted and affixed within sensor cavity 42 by means of any desired retaining fastener (not shown). For example, known spring type retaining fasteners are housed within axial cavities 55 that extend from the outer annular surface 41d to inner annular surface 41c of seal gland second body section 41b. The retaining fastener contacts and affixes sensor 70 within sensor cavity 42. If necessary, sensor 70 can readily be removed and/or replaced from seal gland 41 by removing the retaining fastener from axial cavities 55. This can be done without disturbing any other components of cylinder 25, such as piston assembly 31 or seals 48-51. Due to its location in seal gland second body section 41b, sensor 70 is positioned outside cylinder pressure cavity 30. Thus, by specifically locating sensor 70 outside of the cylinder pressure cavity 30 and within radial sensor cavity 42 in the existing seal gland 41, operating precision is ensured, the original design, or fabrication, of cylinder 25 and piston assembly 31 is not substantially altered, and servicing of both the piston cylinder assembly 20 and sensor 70 can be performed without affecting the functionality of either.

Again referring to FIG. 1, by incorporating sensor 70 into seal gland 41, the overall length of the cylinder unit is increased only by the distance (diametral dimension) needed to house sensor 70. This incorporation utilizes an existing part, seal gland 41, and in combination with indicia markings 81 adds an additional function, namely the position sensing of piston assembly 31 and cylinder 25 relative to each other. An externally attached sensor reading component, such as the addition of a separate radially extending sensing component onto cylinder end 27, will complicate the cylinder unit and add to its size and weight. Cylinders of the type using the present invention are often used on mobile equipment and added external componentry can easily be damaged during use. Such added componentry can also be adversely affected by outside elements such as weather and contaminants.

Figure 5:
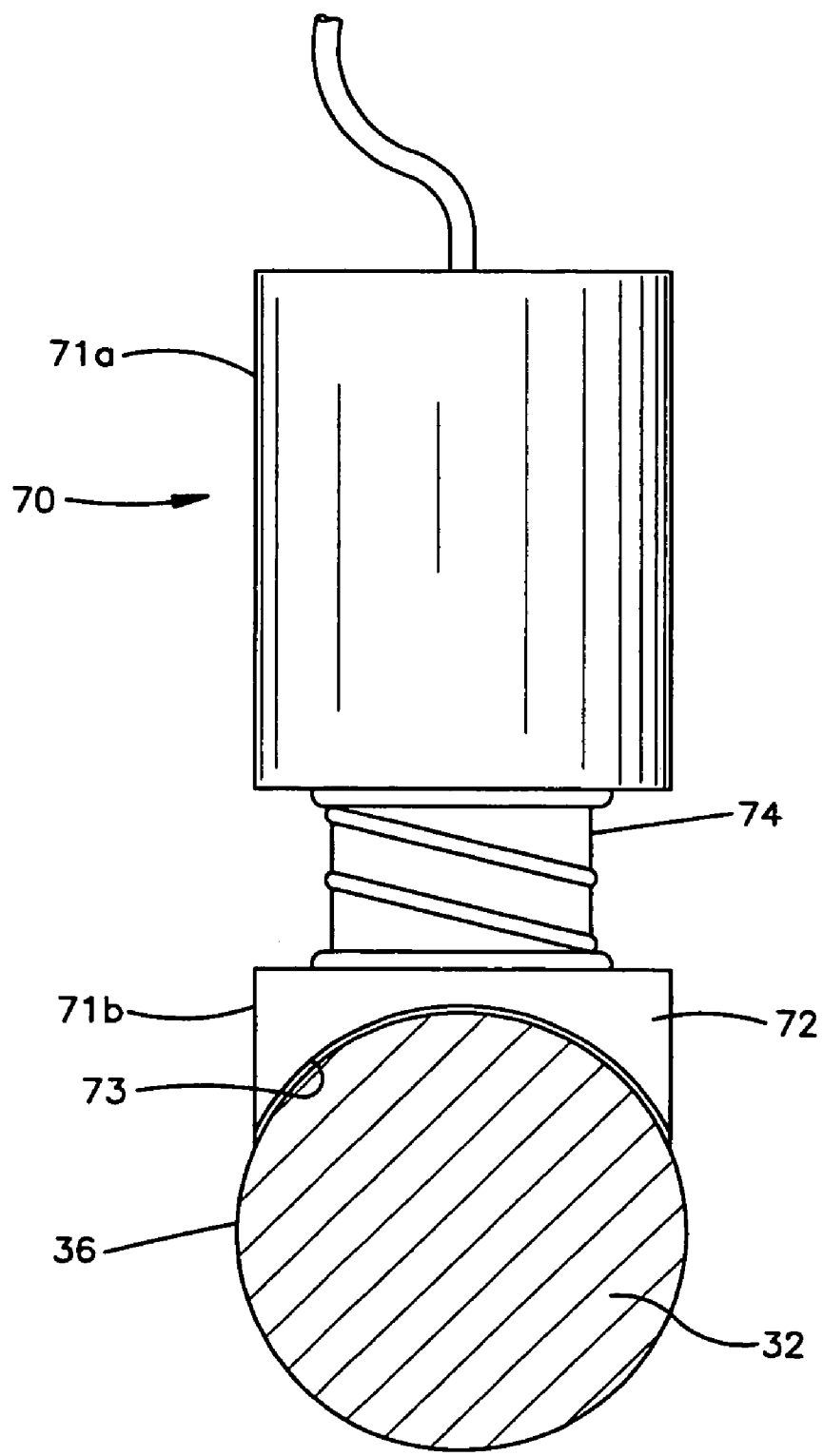
FIG. 5 is a simplified end surface view of the sensor adjacent to the piston rod.

Referring to FIGS. 3 and 5, sensor 70 preferably is a fiber optical sensor having a first end 71a and a second end 71b, the latter being equipped with a spring-loaded collar 74 that is used to apply a constant force onto the slipper element 72. When positioned inside sensor cavity 42, first end 71a extends radially outward. Contact wires are attached to sensor first end 71a in order to communicate the sensor readings to a location accessible to operator perusal, such as the dashboard of the vehicle, for example. Slipper element 72 is preferably manufactured from a wear resistant, synthetic resinous plastic material, such as Delrin®, in order to ensure that its geometry does not change and to provide a low coefficient of friction. An inner surface 73 of slipper 72 has a curvilinear shape in order to substantially conform to the curvature of piston rod peripheral surface 36. Referring to FIGS. 1, 2 and 5, slipper element inner surface 73 slidably mates with piston rod peripheral surface 36 and is specifically superimposed relative to the width of longitudinal band 86. Referring to FIGS. 6 and 7, four fiber optic sensor arrays 84 are each comprised of a plurality of light emitting fibers 87 and light receiving fibers 88 arranged in an alternating and repeating order. Referring to FIGS. 1, 5, and 6, slipper element 72 radially spaces or separates the ends of the four optic sensor arrays 84 of sensor 70 from piston rod indicia markings 34 for a predetermined distance to ensure precise optical reading of the alternating reflected light portions. Upon movement of one of cylinder 25 and piston rod 32, the four optic sensor arrays 84 detect and count signals of successive (both positive and negative) incremental indicia markings 34 by either receiving reflected light from unmarked portions 83 or by not receiving reflected light from marked portions 82. These signals are converted, in a well known manner, from an optical signal to an electronic signal, which is generally denominated as a count. This resulting count can be either positive or negative. By adding to or subtracting from the previous total count, the exact linear position of cylinder 25 and piston assembly 31 relative to each other can therefore be determined. This optical to electronic conversion, which is accomplished via any desired commercially available system, is preferably made directly within sensor 70 or at a remote location.

Figure 8:
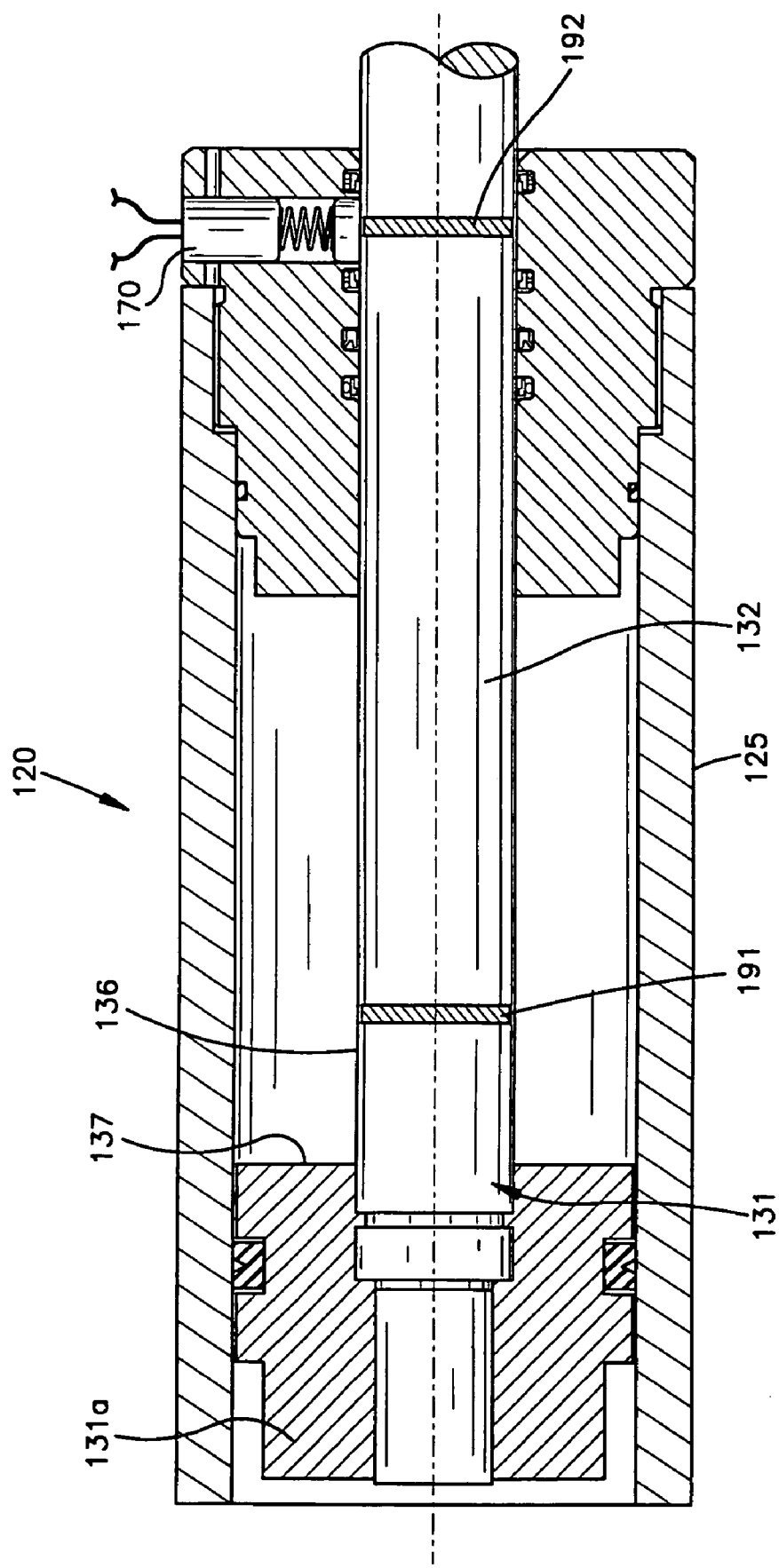
FIG. 8 is an overall longitudinal view, partially in cross-section, of components of a piston/cylinder assembly encompassing a second preferred embodiment of this invention.

As a second embodiment 120 of the present invention, which pertains only to "discrete" indicia markings, is illustrated by the piston assembly 131 in FIG. 8. A preferably fiber optic sensor 170 detects only one or several discrete positions such as either a fully retracted, a fully extended, or any desired other position of piston rod 132. Such an arrangement is commonly known in the industry as an end of stroke sensing arrangement although most known systems rely on externally mounted mechanical or electronic proximity limit switches to provide the desired information. Preferably, only two indicia markings are required on piston rod 132. A first indicia mark 191 is placed on piston rod peripheral surface 136 at a location spaced from piston annular end surface 137 so that its presence can be detected by sensor 170 when piston rod 132 is fully extended. A second indicia mark 192 is placed on piston rod peripheral surface 136 at a location directly radially inwardly of sensor 170 in the manner shown in FIG. 1 so its presence can be detected by sensor 170 when piston rod 132 is fully retracted. First mark 191 and second mark 192 thus coincide with the full extension and retraction locations of piston 131a, respectively. Therefore, sensor 170 will only detect the position of piston rod 132 and cylinder 125 relative to each other at the beginning and the end of the piston stroke.

A variation of the aforementioned set-up would be a mid-stroke sensing arrangement, in which a single indicia mark (not shown) is placed on the piston rod half way between the fully retracted and fully extended position. Sensor 170 would then provide information of the center stroke position, which is desired, for example, in vehicle steering applications. End of stroke and mid stroke sensing arrangements may of course also be combined if so desired, by using these indicia marks. Indicia marks such as 191, 192, etc., preferably are formed on piston rod peripheral surface 136 in the manner described with reference to first embodiment 20. A simplified marking, such as that of embodiment 120, is employed when the user is only concerned with the location of piston 131*a* in desired discrete positions without having to know other positions. Optical sensor 170 is a simplified version of sensor 70 previously described, with reference to the first embodiment 20 shown in FIGS. 1-7, in that only two fiber optic sensing arrays 84 are required. By comparing the amount of light received by both fiber optic sensing arrays 84, the direction and presence of discrete indicia marks 191 and 192 can be detected. If indicia marks 191 and 192 are blocking the light reflection of one array, sensor 170 can detect its presence and can determine in which direction piston 131*a* is traveling.

A further embodiment (not shown) of the present invention includes the use of absolute scale markings on the piston rod peripheral surface rather than the use of the incremental scale marking of the noted first embodiment. This embodiment is similar to the piston-cylinder assembly in the previous embodiments except for this marking change. An absolute scale marking allows the detection of an absolute position anywhere within the marked range contrary to the aforementioned incremental markings, which allow the detection of a position relative to a known reference point. This embodiment further includes an alternative marking technique of the piston rod surface utilizing the photo-sensing technology that is fully depicted and described in U.S. Pat. No. 5,693,935 to Hassler, Jr. et al., which is also assigned to the assignee of the present invention. As explained in the Hassler, Jr. et al. Patent, this alternative marking technique provides indicia markings in the form of a scale tube. The indicia markings take the form of a predetermined series of rings and spacers that have differing light reflection characteristics. In this further embodiment, the required optical sensor remains positioned inside the seal gland, as in the earlier embodiments of this invention, and houses the required probe. Markings on the piston rod, akin to the noted rings and spacers but provided in the manner described with reference to first embodiment 20, will enable detection of the absolute position of the piston rod.

Figure 9:
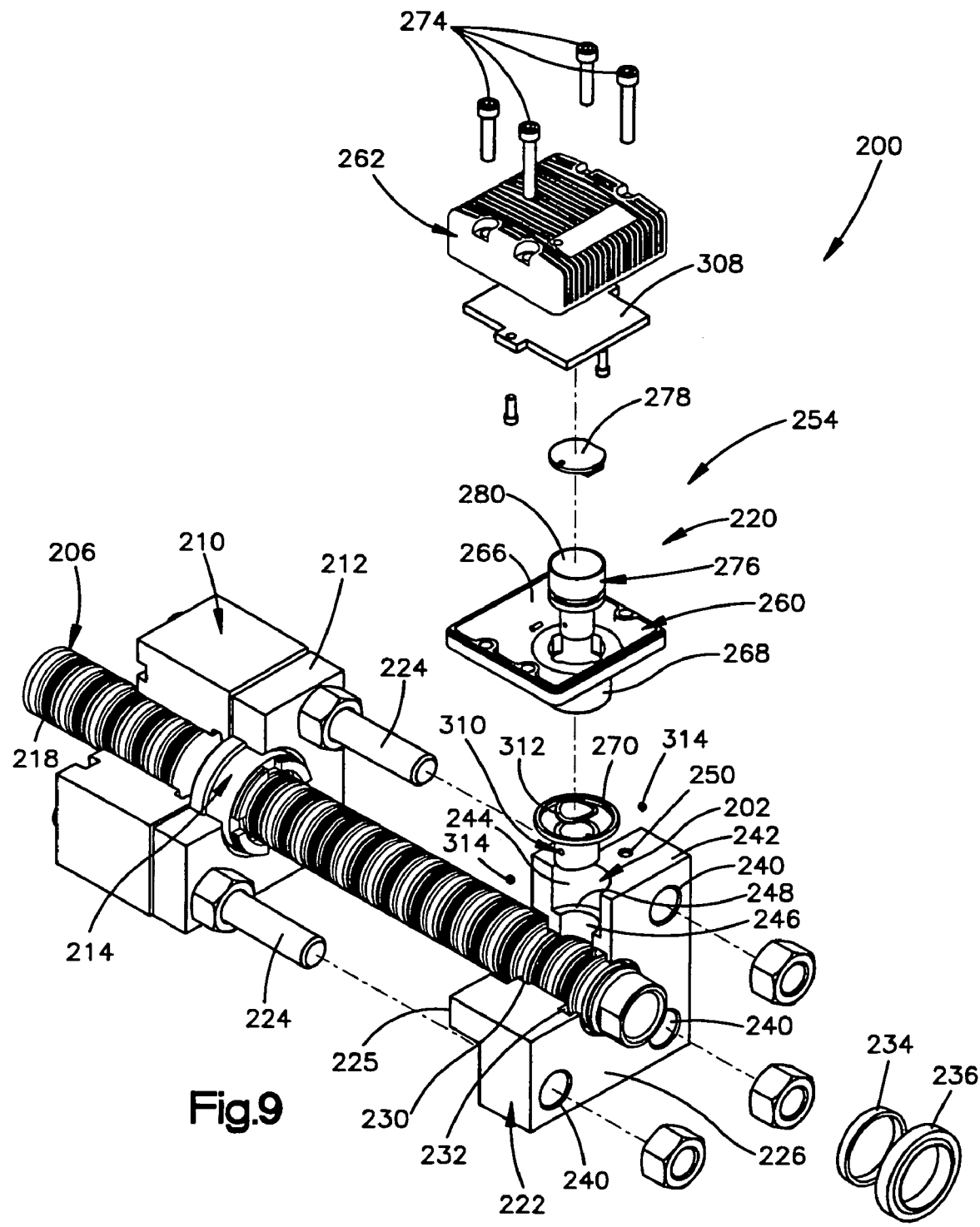
FIG. 9 is an exploded view of a portion of a third embodiment of the apparatus of the present invention.

FIG. 9 illustrates an exploded view of a portion of a third embodiment of the apparatus 200 of the present invention. The portion illustrated in FIG. 9 includes the sensor cavity 202, which is located outside of the pressurized portion, illustrated schematically by dashed lines 204 in FIGS. 12*a* and 12*b*, of the apparatus 200. The pressurized portion 204 may be similar to that shown and described with reference to FIG. 1 or to others known in the art. During operation, the pressurized portion 204 of the apparatus 200 includes pressurized working fluid for moving the piston rod 206.

Reference number 210 in FIG. 9 illustrates an end cap of the apparatus 200. The end cap 210 includes a portion 212 having four bolt holes (not shown). FIG. 9 also illustrates a portion 214 of the sealing gland of the apparatus 200. The portion 214 of the sealing gland is located in an axial passageway that extends through the end cap 210 and through which the piston rod 206 extends.

FIG. 9 also illustrates a portion of the piston rod 206. An outer cylindrical surface of the piston rod 206 includes indicia markings 218. The indicia markings 218 may be formed by the same process as described above with regard to FIGS. 1-7 or any other process for marking a rod. The indicia markings 218 illustrated in FIG. 9 are grouped together to form patterns. The markings 218 may be termed "absolute markings" as each pattern of markings is unique and, when read by the sensor 220, is indicative of a particular position of the piston rod 206. The indicia markings 218 illustrated in FIG. 9 extend circumferentially around the entire outer surface of the piston rod 206.

FIG. 9 also illustrates a sensor block 222. The sensor block 222 of FIG. 9 is separate from the end cap 210 and may be affixed relative to the end cap using fasteners 224. A sensor cavity 202 is located in a sensor block 222. Thus, the sensor cavity 202 of FIG. 9 is located outside of the sealing gland on a side opposite the pressurized portion 204 of the apparatus 200. In an alternate embodiment, the sensor block 222 may be an integral portion of the sealing gland and the sensor cavity 202 may be located in the sealing gland. The sensor block 222 of FIG. 9 includes axially opposite first and second end surfaces 225 and 226, respectively. An axially extending aperture extends through the sensor block 222 from the first end surface 225 to the second end surface 226. The axially extending aperture has a diameter that is sufficiently large to receive the piston rod 206. First and second recesses 230 and 232, respectively, extend radially outwardly into the sensor block 222 from the axially extending aperture. The first recess 230 is located adjacent to the first end surface 225 of the sensor block 222 and the second recess 232 is located adjacent to the second end surface 226. The first and second recesses 230 and 232 are adapted to receive seals. The first recess 230 receives pressure seal 234 and the second recess 232 receives wiper seal 236. The pressure seal 234 and the wiper seal 236 help to isolated the sensor cavity 202 from lubricant and contaminants.

Four bolt holes 240, three of which are shown in FIG. 9, also extend axially through the sensor block 222. The bolt holes 240 are sized for receiving the fasteners 224 for securing the sensor block 222 to the end cap 210. The fasteners 224 of FIG. 9 are bolts that have associated nuts. Means other than bolts and nuts are also contemplated for securing the sensor block 222 to the end cap 210.

The sensor cavity 202 extends radially into the sensor block 222 between an upper surface 242 and the axially extending aperture. The sensor cavity 202 is stepped and includes a large diameter portion 244 located adjacent the upper surface 242 and a small diameter portion 246 that is interposed between the large diameter portion 244 and the axially extending aperture. A first cylindrical surface defines the diameter of the large diameter portion 244 of the sensor cavity 202. A second cylindrical surface defines the diameter of the small diameter portion 246 of the sensor cavity 202. The diameter of the smaller diameter portion 246 forms an opening at the axially extending aperture that is large enough to include at least one complete pattern of the indicia markings 218. An annular surface 248 connects the first and second cylindrical surfaces. Two blind holes, one of which is shown at 250, also extend into the upper surface 242 of the sensor block 222 at diametrically opposite locations relative to the opening to the sensor cavity 202. The blind holes 250 are defined by threaded cylindrical surfaces.

FIG. 9 also illustrates a sensor assembly 254 of the apparatus 200. The sensor assembly 254 includes a housing 256 (FIGS. 12*a* and 12*b*) that attaches to the sensor block 222. The sensor housing 256 is hermetic and includes a base portion 260 (FIG. 9) and a cover portion 262. The base portion 260 of the housing 256 includes a generally rectangular base wall 266 that is surrounded by an upwardly extending flange. The flange in the illustrated embodiment includes four thickened portions, three of which are shown. Threaded blind holes extend into two of the thickened portions. Threaded through-holes extend through the remaining two thickened portions.

The base portion 260 also includes a tubular portion 268 for extending into the large diameter 244 portion of the sensor cavity 202. The tubular portion 268 extends downwardly from the base wall 266 at a location between the two thickened portions having the through-holes. The tubular portion 268 has a first opening at the base wall 266 and a second opening at the bottom of the tubular portion. The second opening has a smaller diameter than the first opening. The second opening is defined by an annular bottom surface (not shown) of the tubular portion 268. The length of the tubular portion is approximately equal to the length of the first cylindrical surface that defines the large diameter portion 244 of the sensor cavity 202. FIG. 9 illustrates an O-ring seal 270 for sealing between the first cylindrical surface of the sensor cavity 202 and the tubular portion 268 at a location adjacent the annular surface 248.

The cover portion 262 of the sensor housing 256 includes a top wall and four side walls. The cover portion 262 is adapted to be received on the base portion 260 so that a chamber is defined within the housing 256. Four through holes extend through the top wall of the cover portion 262 in locations corresponding to the two blind holes and two through-holes of the base portion 260. Fasteners 274 affix the cover portion 262 to the base portion 260. FIG. 9 illustrates two short fasteners that extend through the cover portion 262 and into the threaded blind holes in the base portion 260. FIG. 9 also illustrates two long fasteners that extend through the cover portion 262, through the base portion 260, and into the blind holes 250 in the sensor block 222 for affixing the housing 256 to the sensor block.

The sensor assembly 254 also includes the sensor 220. The sensor 220 includes a probe portion 276 and a portion 278 that includes an illuminator and a light sensitive member. In one embodiment, the illuminator is a light emitting diode and the light sensitive member is a CCD. In the embodiment illustrated in FIG. 9, the portion 278 that includes the illuminator and the light sensitive member is a first printed circuit board. The first printed circuit board 278 is located immediately adjacent an end surface 280 (FIG. 10a) of the probe portion 276.

FIGS. 10a and 10b illustrate the probe portion 276 of the sensor 220. The probe portion 276 includes first and second portions 284 and 286, respectively. The first portion 284 of the probe portion 276 has a cylindrical outer surface 288. The second portion 286 has a cylindrical outer surface 290 having a diameter that is approximately forty percent smaller than the diameter of the first portion 284. An annular recess 292 extends into the outer surface 288 of the first portion 284 of the probe portion 276 at a location near the second portion 286. Two threaded blind holes, one of which is shown at 296, extend into the second portion 286 of the probe portion 276 at diametrically opposite locations. A single pin hole (not shown) is located on the second portion 286 immediately adjacent the first portion 284. An alignment pin (not shown) is received in the pin hole for passing through a key hole located on the annular bottom surface of the tubular portion 268 of the base portion 260 of the housing 256 for ensuring a proper assembly of the sensor 220 within the base portion 260.

First and second sets of optical fibers 302 and 304 (FIG. 10c), respectively, extend through the probe portion 276. Light from the illuminator is transmitted through the first set of optical fibers 302. The first set of optical fibers 302 terminate at an end surface 306 (FIG. 10b) of the second portion 286 of the probe portion 276. The light transmitted through the first set of optical fibers 302 is emitted toward the portion of the piston rod 206 located within the axial aperture of the sensor block 222 in a randomized fashion. Light that is reflected from the indicia markings 218 on the outer surface of the piston rod 206 enters the second set of optical fibers 304 at the end surface 306 of the second portion 286 of the probe portion 276. The second set of optical fibers 304 transmit the received light to the light sensitive member located on the printed circuit board 278.

FIG. 10c illustrates one configuration of the optical fibers on the end surface 306 of the second portion 286 of the probe portion 276. As illustrated in FIG. 10c, the ends of the optical fibers of the second set 304 are arrange to extend in a linear manner with each fiber abutting each adjacent fiber so that the second set of optical fibers forms a single row. The ends of the optical fibers of the first set 302 are also arrange in a linear manner, however, the first set of optical fibers forms two rows. One row formed by the ends of the first set of optical fibers 302 is located immediately above the row formed by the ends of the second set of optical fibers 304. The other row formed by the ends of the first set of optical fibers 302 is located immediately below the row formed by the ends of the second set of optical fibers 304. In the embodiment illustrated in FIG. 10c, the first set 302 includes twice as many optical fibers as the second set 304.

The sensor assembly 254 of the embodiment illustrated in FIG. 9 also includes a second printed circuit board 308 (FIG. 9). A controller, such as a microprocessor, may be located on the second printed circuit board 308 for receiving signals from the light sensitive device and processing the signals. Leads (not shown) from the second printed circuit board 308 extend outward of the housing 256 for providing position information to locations remote from the sensor assembly 254. Power is also supplied to the sensor assembly 254 via the leads. Alternatively, wireless signals may be transmitted from the sensor assembly 254 and the housing 256 may include an internal power source.

The sensor assembly 254 also includes a slipper element 310 and a biasing element 312 (FIG. 9). The slipper element 310 is generally tubular and is fixedly attached to the probe portion 276 using two lock pins 314. FIGS. 11a and 11b illustrate enlarged views of the slipper element 310. One purpose of the slipper element 310 is to act as the interface between the probe portion 276 and the outer surface of the piston rod 206. Specifically, an end of the slipper element 310 that engages the outer surface of the piston rod 206 includes a curvilinear surface 312 that enables the end of the slipper element to conform to the outer surface of the piston rod 206. The radius of curvature of the curvilinear surface 312 is substantially the same as the radius of curvature of the piston rod 206. Preferably, the slipper element 310 is formed from a wear resistant, low friction material, such as Delrin®, as mentioned previously with reference to the slipper element 72 of FIGS. 1-7, or Turcite®. As a result of being formed from a wear resistant, low friction material, movement of the piston rod 206 relative to the slipper element 310 results in little drag from the slipper element and relatively insignificant wear over time.

Another purpose of the slipper element 310 is to maintain the probe portion 276 of the sensor 220 within a predetermined range of distances from the indicia markings 218 on the outer surface of the piston rod 206. To accomplish this purpose, the slipper element 310 is affixed to the probe portion 276. To ensure the proper alignment of the slipper element 310 and the probe portion 276, the slipper element 310 includes an internal ridge 316 that is formed at a predefined distance from the curvilinear surface 312. The ridge 316 is an annular, radially extending surface that connects a large inner diameter portion 318 of the slipper element 310 and a small inner diameter portion 320 of the slipper element. The large inner diameter portion 318 of the slipper element 310 is sized for receiving the second portion 286 of the probe portion 276. The small inner diameter portion is smaller than the diameter of the second portion 286. When the second portion 286 of the probe portion 276 is inserted into the slipper element 310 and is abutted against the ridge 316, the end 306 of the second portion 286 is spaced from the curvilinear surface 312 by the predefined distance. The slipper element 310 also has two diametrically opposite through-holes 322 that extend between an outer diameter 324 and the large portion inner diameter 318. When the end 306 of the second portion 286 of the probe portion 276 abuts the ridge 316, the through-holes 322 of the slipper element 310 are longitudinally aligned with the two threaded blind holes 296 on the second portion 286 of the probe portion 276. Rotation of the probe portion 276 relative to the slipper element 310 aligns the through-holes 322 and the threaded blind holes 296 and also properly orients the lines formed by the ends of the first and second set of optical fibers 302 and 304 perpendicular to the indicia markings 218 of the piston rod 206. When the through-holes 322 and the threaded blind holes 296 are aligned, the locking pins 314 are inserted through the through-holes 322 and are threaded into the threaded blind holes 296 to affix the slipper element 310 relative to the probe portion 276 of the sensor 220. The slipper element 310 spaces the end 306 of the second portion 286 of the probe portion 276 away from the outer surface of the piston rod 206 by the predefined distance by riding continuously on the outer surface of the piston rod. As a result, the ends of the first and second sets of optical fibers 302 and 304 are located in the predetermined range of distances from the indicia markings 218. When the first and second sets of optical fibers 302 and 304 are within the predetermined range of distances, the optical fibers are spaced away from the indicia markings 218 by the proper distances for illuminating and receiving reflections from the indicia markings.

The slipper element 310 also acts to preclude the entry of debris into a sensing area envelope represented by the smallest inner diameter 320 of the slipper element. Since the curvilinear surface 312 of the slipper element 310 abuts continuously against the outer surface of the piston rod 206, particularly during movement of the piston rod relative to the slipper element 310, the slipper element prevent debris from entering into the sensing area envelope. Moreover, the slipper element 310 prevents ambient light from entering the sensing area envelope.

The biasing element 312 acts to maintain the slipper element 310 in contact with the piston rod 206. The biasing element 312 of FIG. 9 is a wave spring. The biasing element 312 is located between the annular bottom surface of the tubular portion 268 of the base portion 260 of the housing 256 and an upper surface 326 (FIG. 11a) of the slipper element 310. The biasing element 312 tends to force the slipper element 310 away from the annular bottom surface. As a result, the slipper element 310 is in continuous contact with the outer surface of the piston rod 206.

The assembled sensor assembly 254 is designed to sense the indicia markings 218 in the sensing area envelope. The sensing area envelope is sized for including at least one pattern of the indicia markings 218. Light from the illuminator passes through the first set of optical fibers 302 and is emitted toward the indicia markings 218. The light reflects off of the indicia markings 218 and is received in the second set of optical fibers 304, which pass the reflected light to the light sensitive member. The light sensitive member senses the received light and provides a signal to the controller that is indicative of the sensed light. The controller analyzes the sensed light, determines the pattern of the indicia markings 218 being sensed, and uses a stored look-up table or other means such as an algorithm for determining the position of the piston rod 206.

It should be noted that the present invention is not limited to the specified preferred embodiments and principles. Those skilled in the art to which this invention pertains may formulate modifications and alterations to the present invention. These changes which rely upon the teachings by which this disclosure has advanced are properly considered within the scope of this invention as defined by the appended claims.

What is claimed is:

1. An apparatus for sensing a position of a first object relative to a second object, the apparatus comprising:
    indicia markings formed on the first object;
    a sensor capable of reading the indicia markings; and
    a slipper element secured relative to the sensor and biased into engagement with the first object, the slipper element maintaining the sensor within a predetermined range of distances from the indicia markings on the first object, wherein the slipper element is affixed to the sensor using fasteners, and
    wherein two through-holes extend through the slipper element, two treaded holes extend into the sensor, each one of the fasteners having an associated through-hole and threaded hole and extending through the associated through-hole and threaded hole for fixing the slipper element relative to the sensor.

2. The apparatus of claim 1 wherein the slipper element includes a feature for engaging an end of the sensor for maintaining the sensor within the predetermined range of distances from the indicia markings.

3. The apparatus of claim 2 wherein the feature includes an internal ridge for engaging the end of the sensor, the internal ridge being spaced from an end surface of the slipper element that engages the first object by a predefined distance.

4. The apparatus of claim 3 wherein the end surface of the slipper element that engages the first object is curvilinear, a radius of curvature of the end surface of the slipper element being substantially equal to a radius of curvature of an outer surface of the first object on which the indicia markings are located.

5. The apparatus of claim 1 wherein the slipper element is generally tubular and has a stepped internal surface, the stepped internal surface having a first portion with a first diameter and a second portion with a second, smaller diameter, an internal ridge forming a transition between the first and second portions.

6. The apparatus of claim 5 wherein the first diameter is sized so that the first portion of the slipper element may receive a portion of the sensor to enable an end of the sensor to abut the internal ridge, the second diameter of the slipper element defining a sensing area for the sensor.

7. The apparatus of claim 1 wherein the first object is a piston rod of a piston assembly and wherein the second object is a cylinder in which a piston associated with the piston rod is located.

8. The apparatus of claim 1 wherein the slipper element is formed from a wear resistant, low friction material so that a generally insignificant amount of wear occurs during movement of the first member relative to the slipper element.

9. The apparatus of claim 8 wherein an end surface of the slipper element engages the first object during movement of the first object relative to the slipper element and preventing debris from entering a sensing area of the sensor.

10. An apparatus for sensing a position of a first object relative to a second object, the apparatus comprising:
indicia markings formed on the first object;
a sensor capable of reading the indicia markings; and
a slipper element secured relative to the sensor and biased into engagement with the first object, the slipper element maintaining the sensor within a predetermined range of distances from the indicia markings on the first object,
wherein the sensor includes a set of optical fibers for receiving light reflected from the indicia markings, the set of optical fibers being arranged in a row, the slipper element, when affixed to the sensor, orients the row formed by the set of optical fibers substantially perpendicular to the indicia markings.

11. The apparatus of claim 9 wherein the set of optical fibers for receiving reflected light is a first set and wherein the sensor also includes a second set of optical fibers for providing light to illuminate the indicia markings.

12. An apparatus for sensing a position of a first object relative to a second object, the apparatus comprising:
indicia markings formed on the first object;
a sensor capable of reading the indicia markings; and
a slipper element secured relative to the sensor and biased into engagement with the first object, the slipper element maintaining the sensor within a predetermined range of distances from the indicia markings on the first object,
wherein the sensor includes a probe portion and a portion that includes an illuminator and a light sensitive member, the probe portion including a first set of optical fibers for transmitting light from the illuminator and emitting the light toward the indicia markings, the probe portion also including a second set of optical fibers for receiving light reflected from the indicia markings and transmitting the light to the light sensitive member.

13. The apparatus of claim 11 wherein the slipper element defines a sensing area for the sensor and preventing ambient light from entering the sensing area.

14. An apparatus for sensing a position of a first object relative to a second object, the apparatus comprising:
indicia markings formed on the first object;
a sensor capable of reading the indicia markings; and
a slipper element secured relative to the sensor and biased into engagement with the first object, the slipper element including a stepped internal surface having a first portion with a first diameter, a second portion with a second, smaller diameter, and an internal ridge forming a transition between the first and second portions, an end of the sensor being received in the first portion and abutting against the internal ridge of the slipper element, the sensor and the slipper element further including associated features for enabling the slipper element to be affixed to the sensor for enabling the slipper element to maintain the sensor within a predetermined range of distances from the indicia marking on the first object,
wherein the associated features of the sensor and the slipper element comprise through-holes in the slipper element and threaded holes in the sensor through which a fastener may extend for affixing the slipper element relative to the sensor.

15. The apparatus of claim 14 wherein the sensor includes a probe portion and a portion that includes an illuminator and a light sensitive member, the probe portion including a first set of optical fibers for transmitting light from the illuminator and emitting the light toward the indicia markings, the probe portion also including a second set of optical fibers for receiving light reflected from the indicia markings and transmitting the light to the light sensitive member, the slipper element defining a sensing area for the sensor and preventing ambient light from entering the sensing area.

16. The apparatus of claim 14 wherein the first object is a piston rod of a piston assembly and wherein the second object is a cylinder in which a piston associated with the piston rod is located.

17. The apparatus of claim 14 wherein the slipper element is formed from a wear resistant, low friction material so that a generally insignificant amount of wear occurs during movement of the first member relative to the slipper element, an end surface of the slipper element engaging the first object during movement of the first object relative to the slipper element and preventing debris from entering a sensing area of the sensor.

* * * * *